Figure 1:
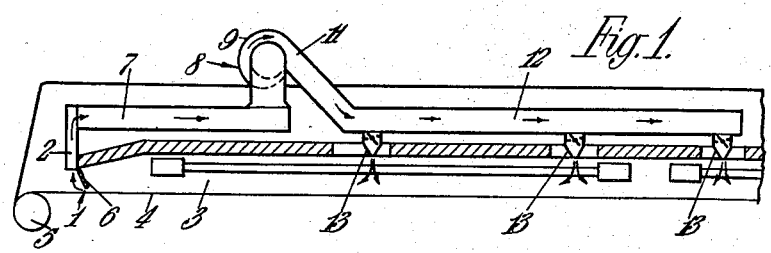

Aug. 5, 1958

J. I. D. WARRINGTON 2,845,880

TRAVELLING CONVEYOR OVENS

Filed March 1, 1954

Inventor
J. I. D. Warrington
By Sleacock Downing Seebold
Attys.

United States Patent Office 2,845,880
Patented Aug. 5, 1958

2,845,880

TRAVELLING CONVEYOR OVENS

James I. D. Warrington, Peterborough, Northampton, England, assignor to Baker Perkins Limited, Peterborough, Northampton, England Application March 1, 1954, Serial No. 413,323

Claims priority, application Great Britain March 6, 1953

2 Claims. (Cl. 107—55)

This invention relates to baking ovens of the type in which the article carrying or supporting means travel continuously through the oven from the feed end to the discharge end, such as travelling plate ovens, travelling rod chain ovens, travelling steel band or grid ovens or swing tray ovens, hereinafter generally referred to as travelling conveyor ovens.

In travelling conveyor ovens in which the conveyor means enter the baking chamber through an entrance, it is not possible to seal such entrance against the unwanted egress of steam. In consequence, steam in considerable volume escapes through the entrance and is liable to cause unpleasant working conditions, damage to the exterior of the oven and present an unworkmanlike appearance. In order to avoid the uncontrolled escape of steam into the bakery, travelling conveyor ovens have been provided with a hood on or adjacent the feed end entrance to the baking chamber, together with suction conduit means and a suction fan for drawing the escaping steam away and discharging it externally to the bakery where it can do no harm. Any steam, however, either escaping uncontrolled from the baking chamber or drawn off and discharged to the atmosphere, is wasted, which is very uneconomical owing to the cost of steam production.

According to the present invention, steam escaping from the baking chamber of a travelling conveyor oven is drawn into a suction conduit system, whereby its uncontrolled escape is greatly reduced or prevented, and is returned either wholly or in part, to the baking chamber at a suitable point or points.

It has been previously proposed to extract deliberately oven atmosphere, which usually contains steam, from one or more points within the baking chamber and return or recirculate it to the baking chamber at another point or points in order to control or in some way modify the baking process. The present invention is not concerned with the deliberate extraction of oven atmosphere from within the baking chamber but is directed to the utilization of steam which is escaping or has already escaped from the baking chamber and would otherwise go to waste, and the return of such steam to the baking chamber is not primarily effected for baking control or modification purposes but as an economy in the steam, which in any case has to be supplied to the baking chamber.

According to a preferred form of the invention, the discharge side of the suction fan or other means for withdrawing escaping steam from the oven hood, is connected with a steam recirculation conduit through adjustable damper means by which the quantity of extracted steam returned to the baking chamber can be regulated. Further the steam recirculation conduit is connected to the baking chamber by means of a distribution conduit having damper means therein, whereby the point of return of the steam to the baking chamber may be adjusted.

Figure 2:
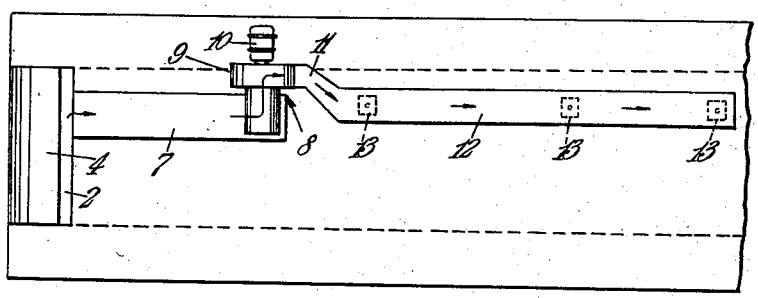
Figure 3:
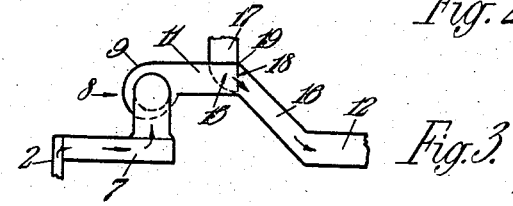
Figure 4:
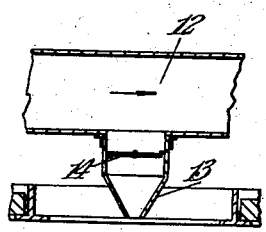

In the accompanying drawing:

Figure 1 is a diagrammatic sectional side elevation of the front end of a baking oven of the travelling conveyor type, incorporating steam recirculation means according to the present invention, Figure 2 is a plan view of the baking oven shown in Figure 1, Figure 3 is a fragmentary detail and side elevation of a modified form of the steam extraction device shown in Figure 1, and Figure 4 is a detail in sectional side elevation of a steam recirculation nozzle according to the present invention, on an enlarged scale.

In carrying the invention into effect according to one mode, by way of example, as applied to a travelling conveyor oven, there is provided slightly in advance of the baking chamber entrance 1 a hood 2 extending over the width of the oven entrance and adapted to receive steam escaping from the oven chamber 3 through the entrance. The oven conveyor 4 passes through the entrance from a turning point 5 in advance of the entrance 1 which is, in known manner, provided with a depending curtain 6 in order to reduce the escape of steam to a minimum.

The hood 2 is connected by conduit means 7 to a suction device 8, preferably in the form of an extraction fan 9 driven by a motor 10 mounted on top of the oven structure. The discharge 11 of the fan 9 is connected to a steam recirculation conduit 12, which extends above the oven in the direction of the discharged end thereof and has spaced nozzles 13 for re-injecting the steam into the baking chamber 3. Each steam re-injection nozzle 13 has damper means 14 therein in order to control the point and degree of re-injection of the steam. The extent of the steam recirculation conduit 12 may normally be co-extensive with that part of the oven in which a steam atmosphere is required for baking purposes, the portion being defined at the front end by the previously mentioned entrance curtain 6 and at the required distance down the baking chamber 3 by a second depending curtain (not shown), so that the steam tends to be confined between two curtains.

According to a modified form of the invention, provision may be made for varying and regulating the quantity of steam returned to the baking chamber by providing a controllable steam outlet through which some or all of the steam may be diverted to the atmosphere. Thus the discharge conduit 11 of the fan 9 may connect with a damper box 15, see Figure 3, which in turn connects with the steam recirculation conduit 12 by a trunk 16 and with a steam escape trunk 17 discharging to the atmosphere. Within the damper box 15 is provided a swing damper 18 pivoted at 19 and arranged to be adjustable as to its position whereby it may swing across the discharge conduit 11 of the fan 9 and regulate the proportion of discharged steam which passes to the steam recirculation conduit 12, or to the steam escape trunk 17.

I claim:

1. In a traveling conveyor oven of the type in which the conveyor means enter the baking chamber through an entrance which it is not possible to seal against the unwanted egress of steam from the baking chamber to the outside air, the provision of a hood in advance of but immediately adjacent the said entrance to the baking chamber, located so as to collect only that steam escaping from the baking chamber through said entrance, suction conduit means connected to said hood, suction creating means connected to said suction conduit means downstream of the hood and including a discharge portion, whereby escaping steam is drawn off through said hood and passes through said suction conduit means and said discharge portion, and steam recirculation conduit means in communication with said discharge portion at one end and connected to the baking chamber at a plurality of points along the length of the baking chamber, said steam recirculation conduit means including a plurality of nozzles directed to discharge steam back into the baking chamber, and damper means operably associated with each nozzle whereby the return flow of steam through each nozzle may be controlled.

2. In a traveling conveyor oven of the type in which the conveyor means enter the baking chamber through an entrance which it is not possible to seal against the unwanted egress of steam from the baking chamber to the outside air, the provision of a hood in advance of but immediately adjacent the said entrance to the baking chamber, located so as to collect only that steam escaping from the baking chamber through said entrance, suction conduit means connected to said hood, suction creating means connected to said suction conduit means downstream of the hood and including a discharge portion, whereby escaping steam is drawn off through said hood and passes through said suction conduit means and said discharge portion, a damper box in communication with said discharge portion and including an alternative steam escape trunk to the atmosphere, steam recirculation conduit means in communication with said damper box at one end and in communication with the interior of the baking chamber inwardly of the entrance thereof, and damper means in said damper box adapted to be swung across the steam path between the suction creating means and the steam recirculation conduit means to regulate the proportion of steam which passes to the steam recirculation conduit means and to the steam escape trunk.

References Cited in the file of this patent

UNITED STATES PATENTS 1,999,503  Houlis _____ Apr. 30, 1935

FOREIGN PATENTS 553,807  Great Britain _____ June 7, 1943